Dec. 4, 1962  A. BRAMLEY  3,066,646
BEDDING
Filed June 24, 1959

ём

3,066,646
BEDDING
Anthony Bramley, Gosford House, Gosford, Kidlington, England
Filed June 24, 1959, Ser. No. 822,520
Claims priority, application Great Britain Oct. 30, 1958
1 Claim. (Cl. 119—28)

The present invention relates to bedding and particularly to bedding for livestock, such as cattle and horses, and domestic animals such as dogs or cats.

It is at the present time usual practice to provide a layer of straw or the like as bedding for cattle. The amount of straw available in a farm of average size has in the past usually been sufficient for this purpose. As a result of the increase in the percentage of short cereal which is now grown the amount of straw available has fallen considerably, and following a bad harvest the supply may not meet the demand.

It is an object of the present invention to provide bedding for cattle which can be used in place of a bedding of straw.

According to a first aspect of the present invention, there is provided a bedding unit comprising a body of a foamed plastics material and an envelope of a waterproof material enclosing the body.

According to a second aspect of the present invention there is provided a bedding unit comprising a body of a foamed plastics material and a surface coating of an impervious material completely enveloping said body.

Figure 1:
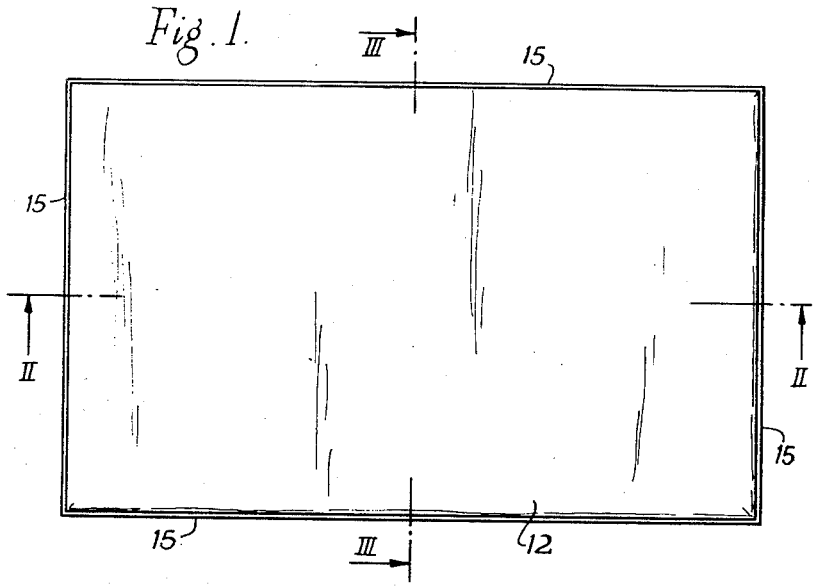
Figure 2:
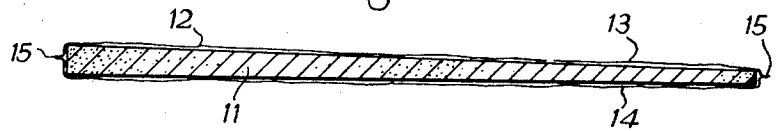
Figure 3:
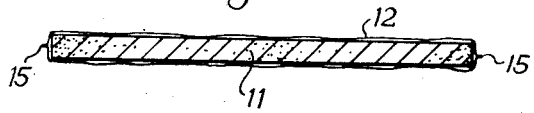
Figure 4:
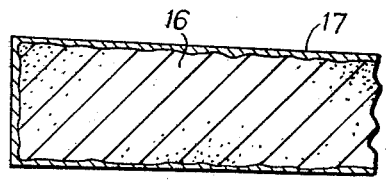

Some embodiments of the invention will now be described by way of example with reference to the accompanying drawing, in which:

FIG. 1 is a plan view of a bedding unit according to the first aspect of the invention, FIG. 2 is a cross-section of the unit shown in FIG. 1 taken on the line II—II in FIG. 1, FIG. 3 is a cross-section of the unit shown in FIG. 1 taken on the line III—III in FIG. 1, and FIG. 4 is an enlarged part cross-section of a bedding unit according to the second aspect of the present invention, the cross-section corresponding to that shown in FIG. 2, FIGS. 1, 2 and 3 show a bedding unit comprising a resilient body 11 enclosed in an envelope 12.

The resilient body 11 is formed from a foamed plastics material. A suitable material is known as a cross linked polyether, and one which is particularly suitable for the unit now described is sold under the name "Aeropreen" and is referred to as polyether APP15. The latter material has a density of 1.98–2.2 lbs. per cu. ft., and a hardness figure of 27. The body 11 may be of any desired size. In the embodiment now described it is 5′ 6″ long and 3′ 4″ wide. It is 3″ thick at one end and tapers uniformly to the opposite end where it is 1½″ thick.

The envelope 12 is formed from two rectangular sheets 13 and 14 of a plastics laminated material. In the embodiment now described the laminated material consists of woven polyethylene terephthalate filament placed between two calendered plies of polyvinylchloride plasticised with a known plasticiser. The sheets 13 and 14 are placed one over the other and stitched and welded together along three of the four edges 15 to form an open bag. The welding operation is carried out by using the well known technique of radio frequency welding.

The resilient body 11 is inserted into the open end of the envelope 12 which is of such a size as to fit closely round the body 11, and the open end of the envelope 12 is sealed by stitching and welding along the remaining edge.

The bedding unit so formed is laid on the ground in a pen in which cattle are to be housed. The unit is of considerable strength by virtue of its fabric-reinforced envelope and will withstand very rough treatment. It certainly suffers no damage when walked on by cattle. The cattle readily settle down on the bedding unit and from observations made, appear to prefer this form of bedding to one composed of loose straw.

It will be apparent that when large areas are to be provided with bedding a plurality of bedding units may be placed side by side to cover the area.

The manufacture of bedding units as hereinbefore described may be regarded as complex and for some purposes the unit may be considered to be unnecessarily robust. An alternative form of unit is shown in FIG. 4 and will now be described with reference to this figure.

Referring to FIG. 4, a bedding unit comprises a body 16 identical in shape and size to the body 11 and composed of a foamed plastics material identical to that of the body 11. The body 16 has a surface coating 17 of polyvinylchloride.

In the manufacture of the unit shown in FIG. 4, the surfaces of the body 16 are first treated by applying a coating of a material known as Duponts Hypalon. A coating of polyvinylchloride is then applied by spraying the body with liquid polyvinylchloride, which gels on to the Hypalon coating and sets. The polyvinylchloride coating is made sufficiently thick to render it tough enough to withstand trampling by cattle. It is impervious to liquids and can readily be cleaned and hosed down. The taper given to the unit facilitates draining during the washing operation.

A similar unit may be formed by applying to the surfaces of the body 16 a coating of Duponts Hypalon and then dipping the body into a bath of liquid polyvinylchloride. A coating of the liquid polyvinylchloride gels to the surface coating of Hypalon on withdrawal of the body and finally sets to form a tough impervious layer completely enclosing the body.

I claim:

A bedding unit for cattle comprising a substantially rectangular body of resilient foamed polyurethane; said body having a front edge and a rear edge; the depth of said polyurethane being within a range of 2.5 to 3 inches at the front edge and between 1.5 to 2 inches at the rear edge; there being a continuous taper from said front edge to said rear edge in order to provide drainage therefrom and added cushioning for the forelegs of the cattle during a kneeling process; and a sealed waterproof envelope, composed of polyvinylchloride reinforced with a polyethylene terephthalate web, totally enclosing said body and corresponding in dimensions thereto.

References Cited in the file of this patent

UNITED STATES PATENTS

| | | |
|---|---|---|
| 2,081,334 | Kickenbush | May 25, 1937 |
| 2,110,909 | Henderson | Mar. 15, 1938 |
| 2,665,664 | Benjamin | Jan. 12, 1954 |
| 2,720,861 | Stroup et al. | Oct. 18, 1955 |

FOREIGN PATENTS

| | | |
|---|---|---|
| 769,680 | Great Britain | Mar. 13, 1957 |
| 1,188,913 | France | Mar. 16, 1959 |

OTHER REFERENCES

Modern Plastics, "Polyurethane," pages 106–108, 214–216.